US011220130B2

(12) United States Patent
Braun et al.

(10) Patent No.: US 11,220,130 B2
(45) Date of Patent: Jan. 11, 2022

(54) METHOD FOR FINISHING A LARGE-SIZE SUPPLIED BUILDING PANEL

(71) Applicant: Flooring Technologies Ltd., Kalkara (MT)

(72) Inventors: Roger Braun, Willisau (CH); Frank Oldorff, Schwerin (DE); Ingo Lehnhoff, Dierhagen (DE); Norbert Kalwa, Horn-Bad Meinberg (DE); Rüdiger Klupsch, Heiligengrabe (DE)

(73) Assignee: FLOORING TECHNOLOGIES LTD., Kalkara (MT)

( * ) Notice: Subject to any disclaimer, the term of this patent is extended or adjusted under 35 U.S.C. 154(b) by 0 days.

(21) Appl. No.: 16/972,837

(22) PCT Filed: Jun. 7, 2019

(86) PCT No.: PCT/EP2019/065013
§ 371 (c)(1),
(2) Date: May 17, 2021

(87) PCT Pub. No.: WO2019/234239
PCT Pub. Date: Dec. 12, 2019

(65) Prior Publication Data
US 2021/0323343 A1    Oct. 21, 2021

(30) Foreign Application Priority Data
Jun. 8, 2018 (EP) ........................................ 8176817

(51) Int. Cl.
*B44C 5/04* (2006.01)
*B44C 1/24* (2006.01)
(Continued)

(52) U.S. Cl.
CPC ............ *B44C 5/0476* (2013.01); *B32B 21/02* (2013.01); *B32B 21/06* (2013.01); *B44C 1/24* (2013.01);
(Continued)

(58) Field of Classification Search
CPC ........ B44C 5/0476; B44C 1/24; E04F 13/105; E04F 13/0871; B32B 21/02; B32B 21/06; B32B 2607/00; B32B 2451/00
See application file for complete search history.

(56) References Cited

U.S. PATENT DOCUMENTS

2017/0334088 A1   11/2017   Lehnhoff et al.
2018/0133922 A1   5/2018    Herrmann et al.

FOREIGN PATENT DOCUMENTS

| CN | 104002349 | 8/2014 |
|---|---|---|
| DE | 102008008240 | 8/2009 |

(Continued)

OTHER PUBLICATIONS

International Search Report in related International Application No. PCT/EP2019/065013 dated Aug. 20, 2019, 8 pages.
(Continued)

*Primary Examiner* — Nathan L Van Sell
(74) *Attorney, Agent, or Firm* — Andrew M. Calderon; Roberts Calderon Safran & Cole, P.C.

(57) ABSTRACT

The disclosure relates to a method for finishing a panel, the method includes a) a relief embossed into the upper side in the form of at least one strip-shaped depression with a depth (T), b) a decorative paper applied to the upper side, c) an overlay paper applied to the decorative paper as an abrasion-resistant layer, d) the lower side provided with a backing layer, e) the structure pressed at a high pressure and temperature, and f) during the pressing, at least one strip-shaped depression again embossed in a second embossing without
(Continued)

Figure 1:
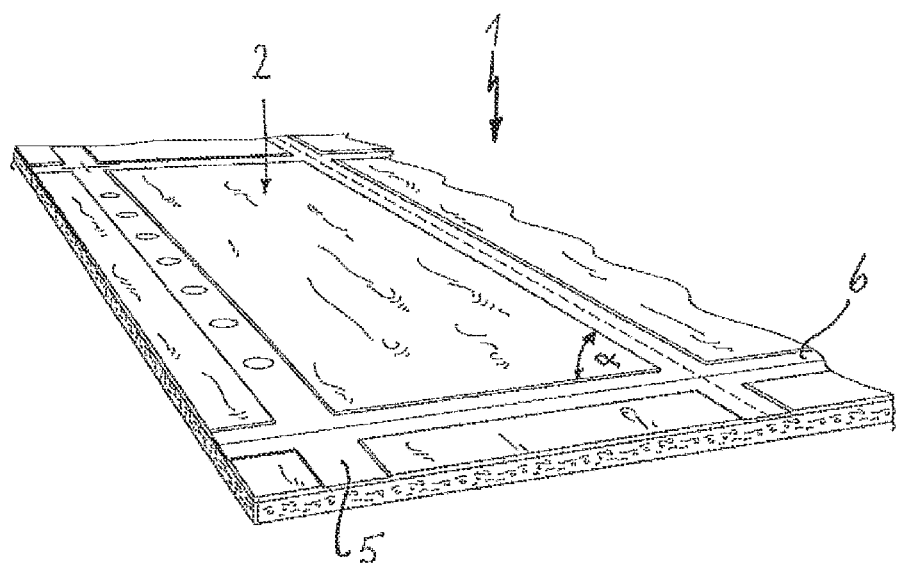

changing the depth (T). Also, the upper side features a press skin that has a thickness of 0.3 to 0.5 mm, the bulk density of the panel in a top layer is between 950 and 1,000 kg/m³, and an aqueous melamine resin is applied to the upper side as a tempering agent before or after embossing.

13 Claims, 7 Drawing Sheets

(51) Int. Cl.
*B32B 21/06* (2006.01)
*E04F 13/08* (2006.01)
*E04F 13/10* (2006.01)
*B32B 21/02* (2006.01)

(52) U.S. Cl.
CPC ........ *E04F 13/0871* (2013.01); *E04F 13/105* (2013.01); *B32B 2451/00* (2013.01); *B32B 2607/00* (2013.01)

(56) References Cited

FOREIGN PATENT DOCUMENTS

| | | | | |
|---|---|---|---|---|
| DE | 102008012220 | | 9/2009 | |
| EP | 1820640 | | 8/2007 | |
| EP | 2905135 | | 8/2015 | |
| EP | 3023261 | | 5/2016 | |
| EP | 3059020 | | 8/2016 | |
| EP | 3118015 | A1 * | 1/2017 | ........... B44C 5/0492 |
| RU | 2612647 | | 1/2017 | |
| WO | 2016180643 | | 11/2016 | |

OTHER PUBLICATIONS

Written Opinion in related International Application No. PCT/EP2019/065013 dated Dec. 12, 2019, 7 pages.
Chinese Office action in CN Application No. 201980038218.7 dated Jun. 11, 2021, 6 pages.
Notice of Allowance in RU Application No. 2020141770/03(077584) dated Nov. 5, 2021, 7 pages.

* cited by examiner

METHOD FOR FINISHING A LARGE-SIZE SUPPLIED BUILDING PANEL

FIELD OF INVENTION

The invention relates to a method for finishing a large-size supplied building panel made of HDF with an upper side and a lower side, said method featuring the following steps: a) in a first embossing step, a relief is embossed at least into the upper side in the form of at least one strip-shaped depression with a depth, b) a decorative paper is applied to the upper side, c) an overlay paper is applied to the decorative paper as an abrasion-resistant layer, d) the lower side is provided with a backing layer, e) the thus-prepared structure is fed to a press and pressed at a high pressure and high temperature, and f) during the pressing process, a strip-shaped depression is again embossed in a second embossing step without changing the depth.

BACKGROUND

This type of method is described, for example, in EP 2 905 135 A2.

EP 1 820 640 B1 describes a method for finishing a large-size supplied building panel made of MDF, wherein a structure or relief is embossed in the upper side, a decorative pattern is applied to the embossed upper side and the decorative pattern is subsequently sealed with an abrasion-resistant layer.

EP 3 023 261 B1 discloses a method for finishing a wood material panel with an upper side and a lower side, wherein a layer of liquid synthetic resin is first applied at least to the upper side or the lower side, then at least one paper layer impregnated with a synthetic resin is laid on top; this structure is subsequently pressed in a press at a high pressure and high temperature, thereby melting the resin and bonding it to the wood material panel.

Once finished, such building panels are divided into individual panels and used, for instance, as floor or wall and ceiling panels; they are often given a wooden, stone or fantasy decorative pattern with a superimposed, three-dimensional surface. The divided panels features joining elements (tongue and groove) and are generally equipped with locking elements for locking adjacent panels in the horizontal and vertical direction (so-called click panels). The superimposition of a decorative pattern and three-dimensional surface results in a realistic impression of the imitated material, both in terms of looks and feel.

In the case of floor panels in particular, it is common for them to feature a coating on at least the upper side and a structure adapted to the decorative pattern. This type of structure is known as an embossed-in-register structure. Here, the decorative pattern is either a paper layer laminated onto the carrier plate or coating printed directly onto the carrier plate. The decorative pattern is also equipped with an anti-wear layer. To this end, either abrasion-resistant paper layers, so-called overlays, or, after curing, abrasion-resistant lacquer or resin layers are used. The EIR structure is in the form of a three-dimensional surface structure and is embossed in the panel surface by means of a corresponding three-dimensionally structured press plate. During this process, the components of the coating that are activated by heat and pressure melt and run, thereby filling out the three-dimensional structural embossing while curing. The structure generally has a height of up to 500 µm. The number and depth of the structures are limited by the available quantity of activated components on the one hand, and by the press force on the other.

In the case of laminate flooring, the joint edges where adjacent floor panels meet are problematic. Depending on the light falling on it, even the smallest differences in height cause visually unattractive shadows that negatively affect the overall appearance of a floor. The wood material core also renders the panels sensitive to moisture. Any liquids spilled on the floor must be wiped away as quickly as possible to prevent the liquid from penetrating into the connecting joints between the joint edges. Should any water penetrate, the wooden fibers in the carrier panel may expand and cause irreversible swelling, as the swelling pressure in the wood partially hydrolyses the joint and/or the adhesive. It is therefore important that what will later become the joint edges are given special attention during the production of the panels. Adjacent panels should be able to lie firmly against each other, there should be a visually uniform appearance to a floor of laid panels and precautions must be taken to ensure that spilled liquid cannot immediately flow into the connecting joints.

WO 2016/180643 A1 describes a method for producing floor panels which feature locking profiles for mechanically locking similar panels together, wherein two panels locked together form a common joint at the upper side.

DE 10 2008 008 240 A1 describes a carrier plate, on the upper side of which water is applied before coating, which is absorbed and causes a steam shock during the subsequent pressing process, thereby causing the uppermost layer to heat up very quickly. The heat and moisture result in a better plastic deformability and thus enable the embossing of deeper pressed sheet structures. The moisture also improves the heat transfer from the press plates of the short-cycle press into the wood material panel.

EP 3 059 020 A1 describes the treatment of a wood material panel with steam, which can have a temperature of up to 60° C. The purpose of this treatment is to achieve as uniform a moisture level as possible on the carrier plate in order to improve the primer for printing. For this purpose, the moistened upper side is first sanded and then preheated to a temperature of approximately 45° C. This is followed by a first application of resin as a rolling base. A white primer is rolled onto this rolling base.

SUMMARY

On the basis of this problem, the method described in the introduction should be improved accordingly.

In order to avoid the aforementioned disadvantages, the method according to the preamble is characterized in that
g) the upper side features a press skin that has a thickness of 0.3 to 0.5 mm,
h) the bulk density of the building panel in the top layer that forms the upper side is between 950 and 1.000 kg/m$^3$,
i) an aqueous melamine resin is applied to the upper side as a tempering agent before or immediately after embossing,
j) the press is a short-cycle press.

The large-size panel is later divided into individual panels along the embossed depressions. As a result of the embossed depressions, the upper side of the panels is lowered at the side edges. The joint edges of adjoining panels are therefore lower than on the upper side. In such a case, height offset cannot cause shadows that are visually noticeable because all butt joints are lowered. A firm joint between adjacent panels can be achieved by means of appropriate edge profiling, which effectively prevents liquid from penetrating too quickly into the butt joint.

The pressing of the structure in the short-cycle press is conducted at high pressure and high temperature. The conceivable range of pressure ranges from 40 to 100 kg/cm$^2$, whereby 40 kg/cm$^2$ is standard for older short-cycle presses. Newer systems achieve 60 or even 80 kg/cm$^2$. However, some short-cycle presses are known which work at a pressure of 100 kg/cm$^2$. The temperature of the heating plates in the short-cycle press is 180 to 200° C.

In order to be able to lower the side edges of the panels all the way round, at least one further depression is preferably embossed at an angle transverse to the at least one depression. Here too, a number of transversely running depressions are preferably embossed, along which the panels can then be divided in the transverse direction.

It is intended that the bulk density profile (progression of the density across the cross-section of the panel) of the HDF panel is lowered compared to a conventional bulk density profile, as known from EP 3 023 261 B1, for example. When the fiber cake is pressed to form a building panel of the desired thickness, the greatest bulk density occurs in the region of the upper and lower side of the panel. As a result of the heat input during pressing, a press skin forms on the upper and lower side, which is also called the "rotting layer". Since the panel has been pressed with a maximum bulk density in the top layers of 950-1000 kg/m$^3$, it can be supplied press-finished, i.e. the press skin is not removed. However, it is also possible to at least partially sand down the press skin to reduce the density on the upper side, for instance to a thickness of 0.3-0.5 mm.

Before or after embossing, before the decorative paper is applied, a tempering agent, which is an aqueous melamine resin, is applied to the upper side. The tempering agent ensures that the previously reduced bulk density on the upper side (in the top layer) is increased again to achieve sufficient strength properties on subsequent panels.

To facilitate embossing, the building panel is preferably heated to 30 to 50° C. and during the embossing of the at least one depression, a surface temperature of up to 220° C. is achieved. The building panel can be heated using steam.

The first embossing step can be carried out using at least one calender roll. This has the advantage that the embossing step can be integrated into the production line. Embossing can then follow on directly from the pressing of the wood material panel in a continuous press, in which the previously scattered fiber cake has been pressed to form a panel of the desired thickness. However, the first embossing step can also occur in a short-cycle press, in which the upper press plate features strip-shaped elevations.

If desired, one or several paper layers can be applied as an underlay under the decorative paper. These paper layers are impregnated with a melamine resin like the decorative paper.

Once the structure is completed, consisting at least of a primer, the decorative paper, the overlay and a backing layer arranged on the lower side, the building panel is laminated in a short-cycle press under high pressure and at a high temperature. In a second embossing step, it is embossed once again in the at least one strip-shaped depression to achieve the formation of the side walls without changing the position of the bottom wall in terms of depth. As a result of the coating with the papers, the side walls formed in the first embossing step are "rounded", so that the second embossing step transforms these rounded sections back into a flat surface. If desired, this structure can also consist of the underlay papers arranged under the decorative paper.

If the tempering agent was applied before the first embossing step and a sufficiently high temperature is achieved in the first embossing step, the melamine resin cures already during the first embossing step and increases the bulk density. If the tempering agent is not applied until after the first embossing step, it cures in the short-cycle press during the second embossing step. The same applies if a sufficiently high temperature is not achieved in the first embossing step.

The depth of the at least one depression is preferably up to 0.7 mm and can in particular be graded so that the bottom wall is in the form of steps. In such a case, several first pressing steps with different press depths are carried out.

In order to be able to align the building panel during the subsequent further processing steps, markings, which may be in the form of lines, circles, dots, crosses or other graphic characters, can be printed on the decorative paper where it reaches the base walls of the at least one depression. Preferably, lines are used. Instead of printed markings, markings can also be embossed in the second embossing step which are transferred to the building panel as matt or shiny areas or geometric figures with the aid of the press plate. These markings can be used by a camera system to align the building panel for either the second embossing step or solely for further subsequent processing steps. Such markings can also be provided on the edge of the decorative paper so that they are located on the outer edge of the coated building panel.

Re-embossing in the depression in the second embossing step is preferably conducted in a short-cycle press, in which strip-shaped elevations are applied to the press plate.

In the second embossing step, a structure can be embossed into the upper side which is at least partially synchronous with the decorative pattern; in technical terminology, this is known as "embossed in register".

DETAILED DESCRIPTION FO THE DRAWINGS

Figure 2:
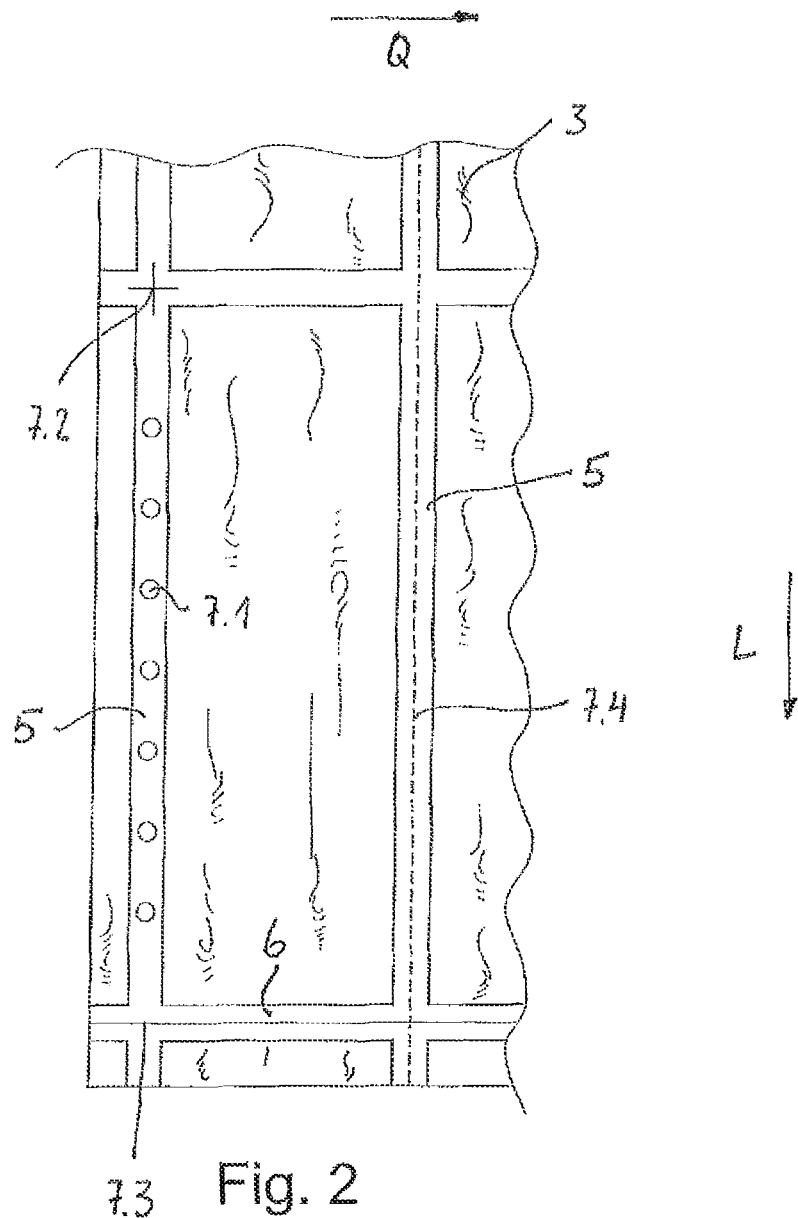
Figure 3:
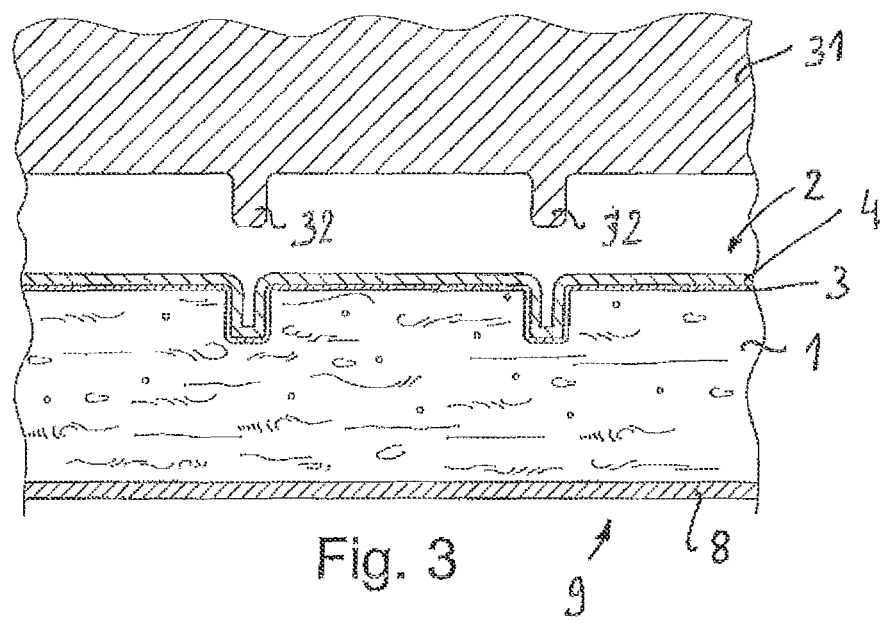
Figure 4:
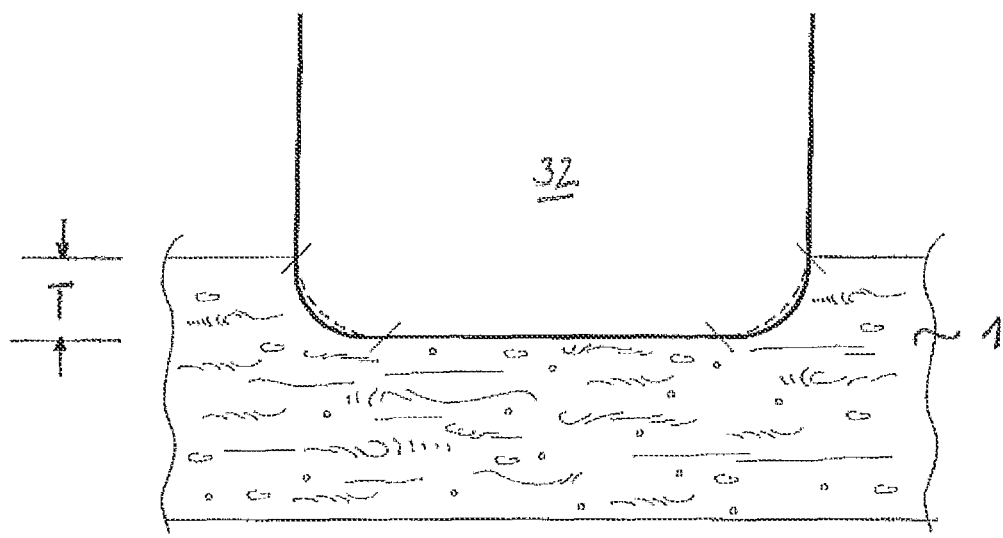
Figure 5:
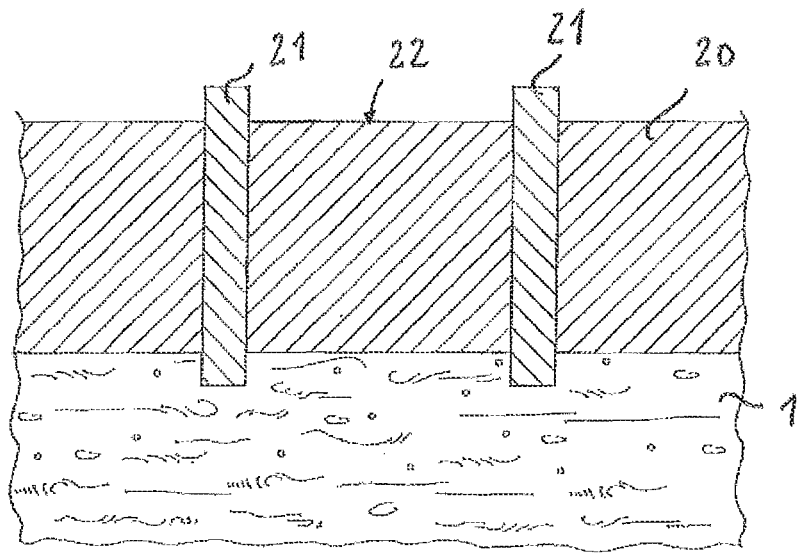
Figure 6:
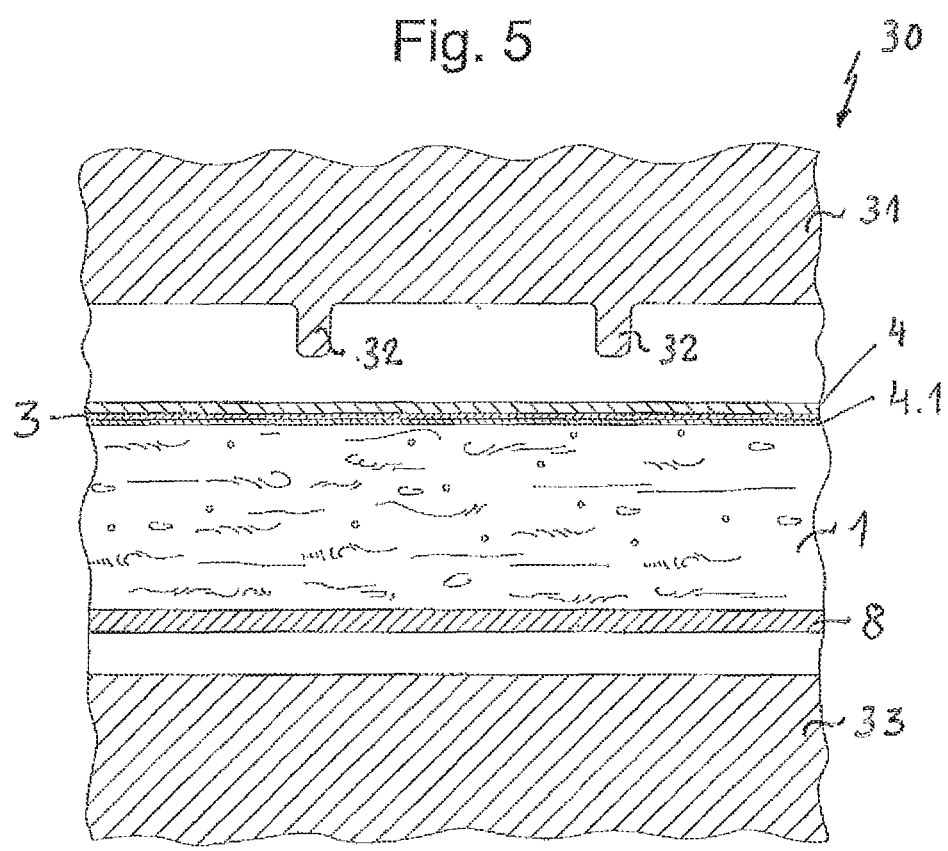
Figure 7:
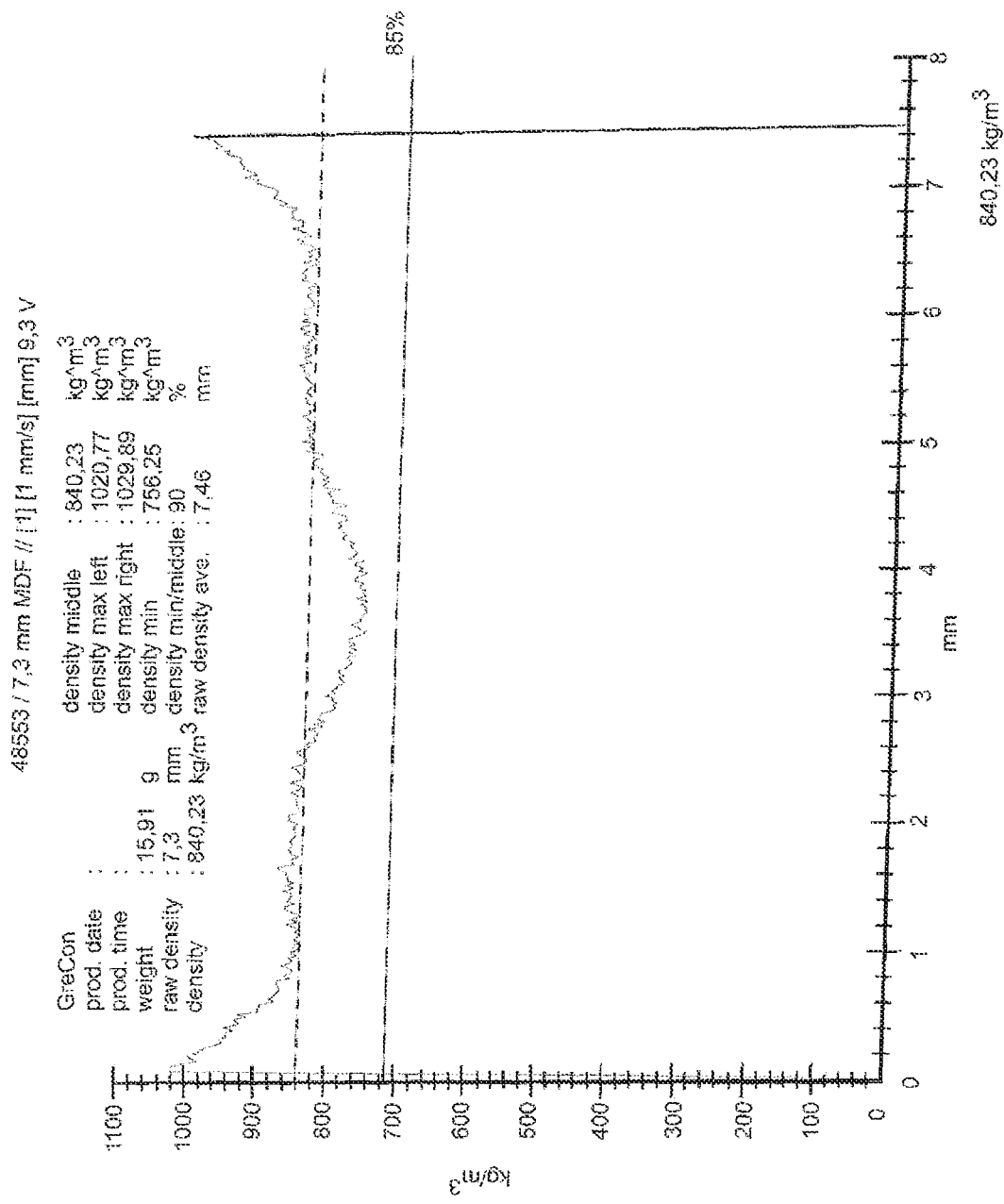
Figure 8:
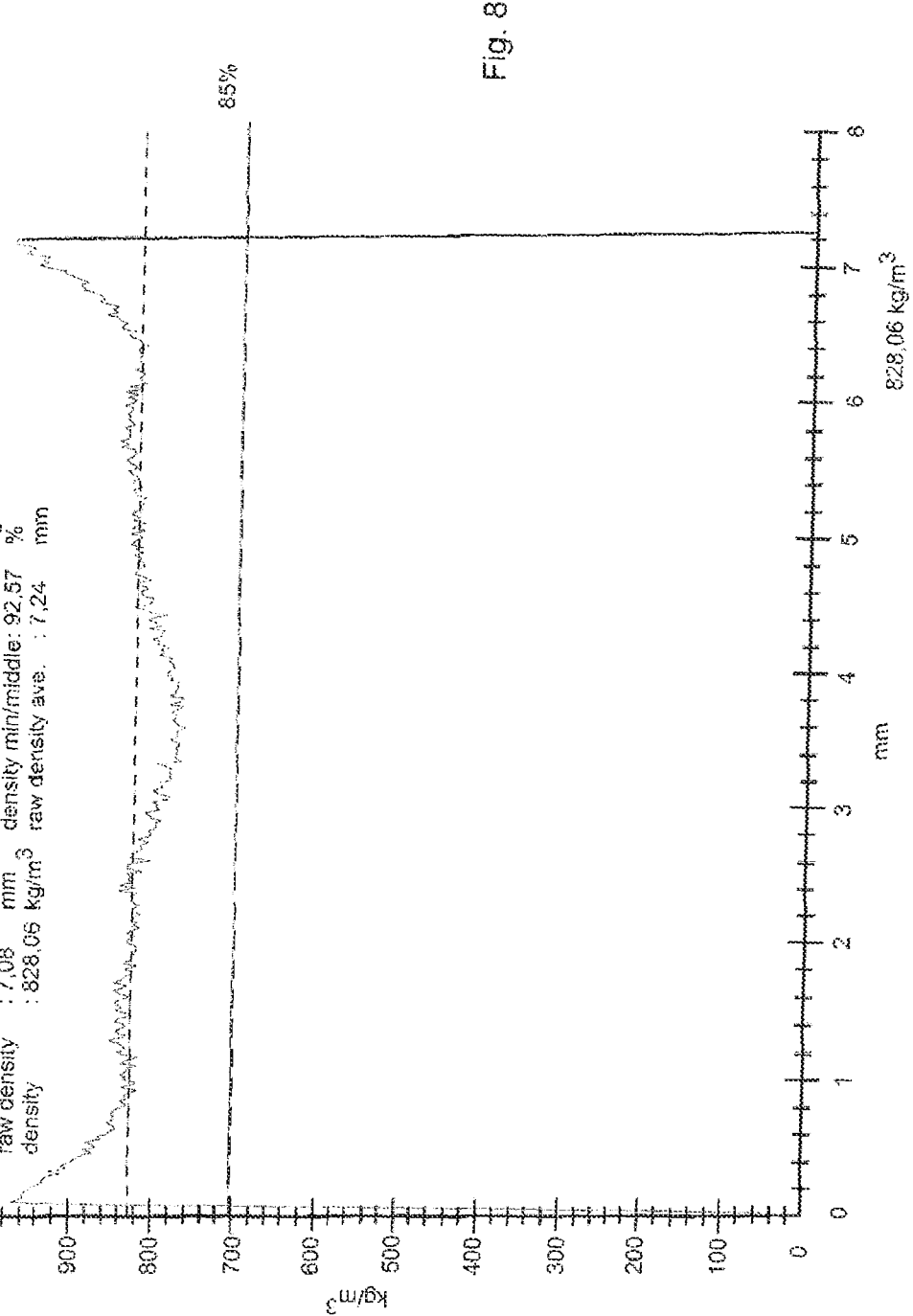
Figure 9:
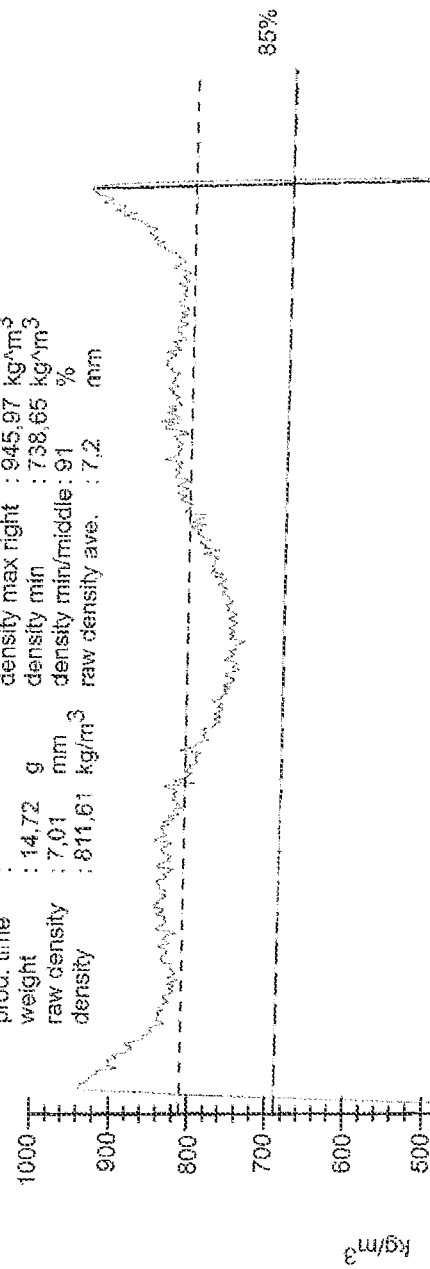

In the following, an example of an embodiment of the invention will be explained in more detail with the aid of a figure: They show:

FIG. 1—a perspective partial image of a large-size building panel;

FIG. 2—the top view of the building panel according to FIG. 1;

FIG. 3—a schematic partial image before the second embossing step;

FIG. 4—an enlarged partial image during the second embossing step;

FIG. 5—a schematic partial image during the first embossing step;

FIG. 6—a schematic image of the building panel in the short-cycle press;

FIG. 7—a typical bulk density profile of an HDF panel;

FIG. 8—the bulk density profile of a first large-size building panel;

FIG. 9—the bulk density profile of a second large-size building panel;

DETAILED DESCRIPTION

The starting point is a large-size HDF panel with a length of 2800 or 1860 mm, a width of 2070 mm and a thickness of 7 to 14 mm. The bulk density is lower than that of a conventional HDF panel, as a comparison of FIG. 7 with FIGS. 8 and 9 shows. In order to form a weak top layer that can be plastically deformed, the peaks of the top layer have been lowered by at least 40 kg/m³ compared to the standard. Good results have been achieved with a lowering of up to 60 kg/m³. The bulk density then ranges from 950 to 1000 kg/m³. An example of the bulk density profile of a conventional HDF panel is shown in FIG. 7. FIGS. 8 and 9 depict examples of bulk density profiles of building panels used according to the invention.

The HDF panel can supplied press-finished, i.e. with the complete press skin. Preferably, however, the press skin is sanded down to a thickness of about 0.3 mm in order to deliberately "weaken" the top layer.

In order to emboss depressions 5, 6 into the upper side 2 of building panel 1, said panel is first heated to a temperature between 30 and 50° C. by applying 10 to 30 g/m² of steam. 10 to 50 g/m², preferably 30 g/m², aqueous melamine resin is then applied as a tempering agent. This can be a standard impregnating resin with a solid content of 50 to 65% by weight, preferably 60% by weight. In addition to water a solvent, other additives such as curing agents, wetting agents and the like may be present in the formula. Alternatively, UF resin or, in mixtures, UF and melamine resin can be used as a tempering agent. It is either a postforming resin or a standard impregnating resin, which is rendered more elastic by adding flexibilizing agents (e.g. 1,4-butanediol, caprolactam, polyglycol etc.) A subsequent addition of the elasticizer should be in the range of about 3 to 7% by weight.

The building panel 1 pre-treated in this way is passed through one or more calender rolls 20 arranged one behind the other with embossing rings 21 arranged parallel to them. In a first embossing step, depressions 5, 6 with a depth T of up to 0.7 mm are embossed into the upper side 2 via the at least two embossing rings 21, wherein said depressions extend in longitudinal direction L and transverse direction Q. Here, the line pressure of the embossing rings 21 is up to 300 N/mm and the surface temperature is up to 220° C. In this first embossing step, the tempering agent on the upper side 2 is at least partially converted, i.e. it cures at least partially and thus increases the bulk density again. The depressions 5, 6 can be formed in steps, for example by using several calender rolls 20 with different embossing rings 21 and initially embossing, for example, 0.3 mm and then a further depth T of up to 0.7 mm.

If the diameter of the calender roll 20 is large enough, webs running parallel to the axial direction can also be provided on its circumference, with which the depressions 6 can be embossed in the transverse direction Q. If necessary, a calender roll 20 with embossing rings 21 can be followed by a calender roll with parallel webs running only in the axial direction.

After the first embossing step, one or more layers of resin-impregnated paper can be applied to the upper side 2 as an underlay and a decorative paper 3 then applied on top; it is also possible to only apply such a decorative paper. The decorative paper 3 can be single-colored or multicolored and is applied in such a way that it is at least partially synchronised with the structure that has just been embossed. The decorative paper 3 may feature markings 7. The markings 7 can be circles 7.1, crosses 7.2, lines 7.3 and dashes 7.4 or other geometrical figures. Via these markings 7, the building panel 2 can be aligned by a camera system for carrying out further processing steps.

A backing layer 8 is subsequently placed on the lower side 9 of the building panel 1 and an overlay paper 4 on the decorative paper 3 as an abrasion-resistant layer. This structure is then fed to a short cycle press 30 with an upper press plate 31 and a lower press plate 33. The upper press plate 31 features strip-shaped elevations 32. Using the markings 7 and a camera system, the building panel 1 is aligned so that the elevations 32 dip again into the embossed depressions 5, 6 during the subsequent pressing of the structure and the side walls 5.1, 5.2 of the depressions 5, 6, which are rounded during the coating of the upper side 2, are embossed again in order to adjust parallel and flat side walls 5.1, 5.2 in a second embossing step without changing the depth T of the depressions 5, 6 or the position of the bottom wall 5.3. As FIG. 4 shows, the elevations 32 in the transition area from the side walls 5.1, 5.2 to the bottom wall 5.3 are designed to be larger than the width of the depressions 5, 6, in order to safely form the lower edges of the depressions 5, 6. Between the strip-shaped elevations 32, the press plate 31 can feature an engraving by means of which a structure is embossed into the upper side of the overlay during pressing, said structure being at least partially aligned synchronously with the decoration (embossed in register).

By corresponding processing of the press plate 11, geometric figures or lines can also be embossed on the floor walls 5.3, which appear as matt or shiny areas on the surface.

The press time in the second embossing step is between 10 and 30 seconds, preferably 12 to 15 seconds, during which time the resins melt and bond to the building panel 1. The temperature of the press plates 31, 33 is up to 200° C. The pressure curve changes from a pressure build-up phase to a holding phase and a pressure reduction phase. Here, the embossing depth T will occur in the manner of a path control. The pressure in the short cycle press is 40 to 100 kg/cm². The temperature of the heating plate, via which the press plates 31, 33 are heated, is 180 to 220° C. Preferably, pressing is carried out at a heating plate temperature between 190 and 210° C.

To achieve a sensible design, at least two depressions 5, 6 must be embossed in the first embossing step in the longitudinal direction L and at least two in the transverse direction Q, so that the side edges of the divided panels are all lowered.

The invention claimed is:

1. A method for finishing a supplied building panel with an upper side and a lower side, the method comprises:
    a) in a first embossing step, embossing a relief at least into the upper side in a form of at least one strip-shaped depression comprising a bottom wall with a depth (T);
    b) applying a decorative paper to the upper side;
    c) applying an overlay paper to the decorative paper an abrasion-resistant layer;
    d) feeding the thus-prepared structure to a press and pressing the structure;
    e) during the pressing, at least one strip-shaped depression is again embossed in a second embossing step without changing the depth (T),
    f) the upper side includes a press skin that has a thickness of 0.3 to 0.5 mm;
    g) a bulk density of the building panel the top layer that forms the upper side is between 950 and 1.000 kg/m³,
    h) the lower side includes a backing layer prior to pressing; and further comprising:
    i) heating the building panel using steam prior to the embossing until it reaches a surface temperature of 30 to 50° C.,
    j) applying an aqueous melamine resin to the upper side as a tempering agent before or immediately after the embossing; and
    k) the press is a short-cycle press with pressure and temperature.

2. The method according to claim 1, wherein at least one further depression is embossed at an angle (α) transverse to the at least one depression.

3. The method according to claim 1, wherein the first embossing step is carried out with at least one embossing calender roll which operates under application of a pressure of up to 300 N/mm² and a surface temperature of up to 220° C.

4. The method according to claim 1, wherein the first embossing step is carried out in a short-cycle press with a deeply structured press plate.

5. The method according to claim 1, wherein the depth (T) is up to 0.7 mm.

6. The method according to claim 1, wherein the depth (T) is in a form of steps, so that the bottom wall is designed in the form of the steps.

7. The method according to claim 1, further comprising embossing markings on a region of the bottom wall.

8. The method according to claim 7, wherein the markings, which comprises lines, circles, dots, crosses or other graphic characters, are printed on the decorative paper where it reaches the base walls of the at least one depression.

9. The method according to claim 4, wherein re-embossing in the depression in the second embossing step is conducted by strip-shaped elevations the press plate of the short-cycle press.

10. The method according to claim 1, wherein a structure is embossed into the upper side which is at least partially synchronous with the decorative pattern.

11. The method according to claim 1, further comprising dividing up the large size building panel into individual panels by carrying out a saw cut in and along each of the depressions.

12. The method according to claim 4, wherein the first embossing step is carried out in the short-cycle press by means of strip-shaped elevations on the press plate.

13. The method according to claim 1, wherein the supplied building panel is made of HDF.

* * * * *